April 13, 1965     B. C. MOORE     3,178,135
LANDING AIRCRAFT WHEEL ROTATOR
Filed Dec. 30, 1963     2 Sheets—Sheet 1
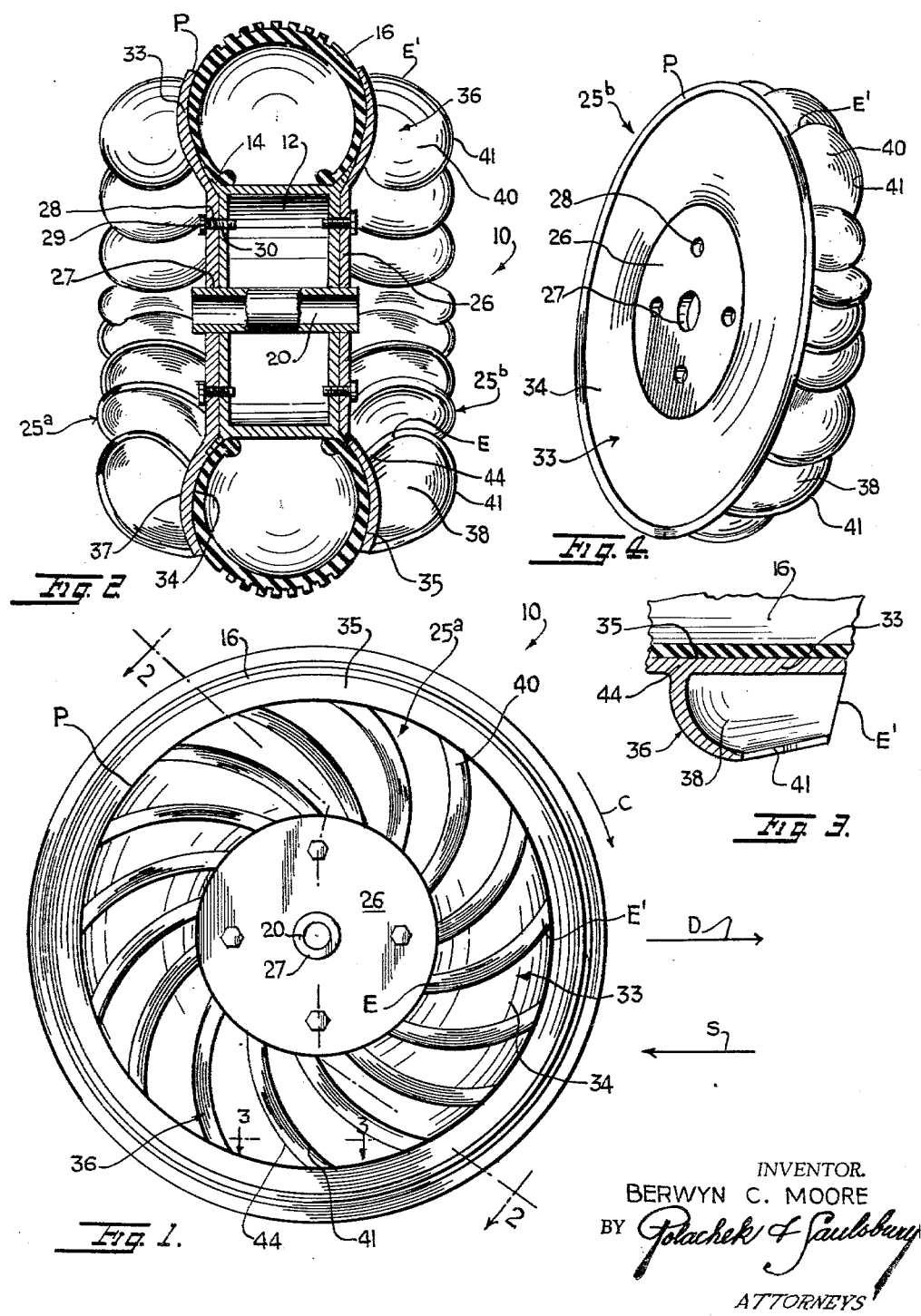
INVENTOR.
BERWYN C. MOORE

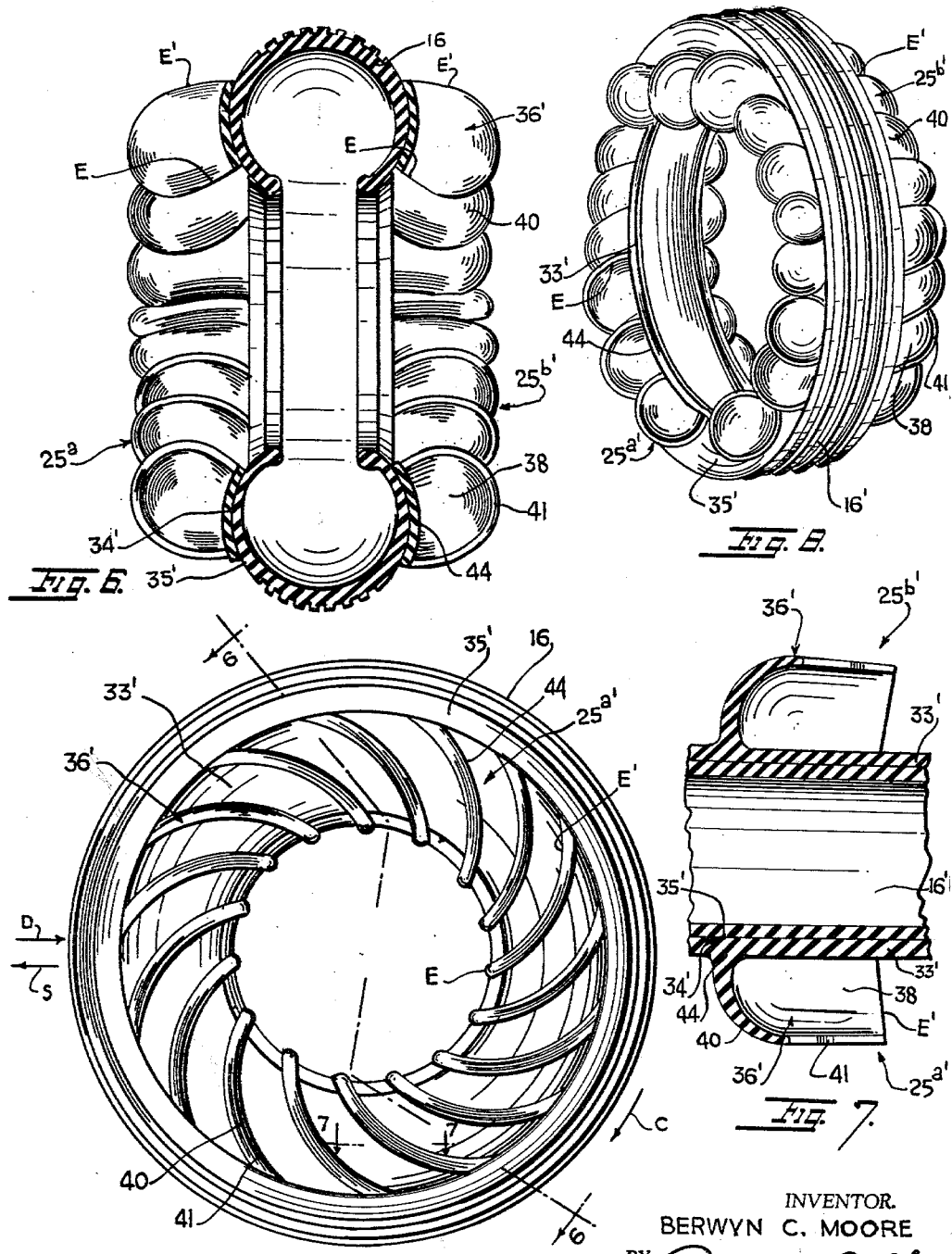

United States Patent Office 3,178,135
Patented Apr. 13, 1965

3,178,135
LANDING AIRCRAFT WHEEL ROTATOR
Berwyn C. Moore, Farmington, Ill.
Filed Dec. 30, 1963, Ser. No. 334,095
2 Claims. (Cl. 244—103)

This invention concerns an improved rotator for an airplane landing wheel.

It has been recognized heretofore that aircraft landing wheels should be provided with rotator means to set the landing wheels in rotation prior to landing, to reduce landing wheel tire wear, to prevent contact shock, and to prevent an aircraft from nosing over when the tires first make contact with the ground, and to reduce drag on takeoff. Previously proposed rotators for airplane landing wheels have involved rather complex mechanisms including hydraulic motors, which have sometimes failed to operate due to their very complexity. Others have been difficult to install and remove, or too small to be fully effective for aircraft landing at high speeds of the order of 150 miles per hour, or too massive.

The present invention avoids the above difficulties and disadvantages in providing simplified rotator means in the form of air scoops integral with the tire of a landing wheel or integral with a plate which can be juxtaposed to a tire and detachably secured to the hub of the landing wheel.

It is therefore one object of the invention to provide rotator means for an aircraft landing wheel, including a series of curved air scoops circumferentially spaced around each side of the pneumatic tire of the wheel and extending laterally outward on both sides of the tire.

Another object is to provide rotator means as described wherein the air scoops are integral with the sides of the tire.

A further object is to provide rotator means as described wherein the air scoops are integral with plates detachably securable to the sides of the wheel.

Still another object is to provide a rotator assembly of simplified structure, which is relatively inexpensive to manufacture, which is easy to install, and which is fully effective in operation.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a side view of an aircraft landing wheel with a rotator assembly thereon, according to the invention.

FIG. 2 is a sectional view taken on line 2—2 of FIG. 1.

FIG. 3 is an enlarged fragmentary sectional view taken on line 3—3 of FIG. 1.

FIG. 4 is an oblique perspective view of a rotator plate employed in the assembly of FIGS. 1 and 2.

FIG. 5 is a side view of a pneumatic tire provided with rotator means according to the invention.

FIG. 6 is a sectional view taken on line 6—6 of FIG. 5.

FIG. 7 is an enlarged fragmentary sectional view taken on line 7—7 of FIG. 5.

FIG. 8 is an oblique perspective view of the tire of FIGS. 5 and 6.

Referring first to FIGS. 1–4, there is shown an aircraft landing wheel assembly 10 including a cylindrical drum 12 having peripheral annular flanges 14 defining sides of a channel in which is engaged a pneumatic toroidal tire 16. The drum has axially spaced end plates 18 or a frame in which is centrally secured an axial hub 20 for engaging on an axle of the aircraft. To the extent described the wheel is conventional.

The invention is embodied in a pair of lightweight, rigid rotator assemblies 25$^a$, 25$^b$. Each of these assemblies includes a central flat, circular plate 26 provided with a central hole 27 which receives hub 20. Circumferentially spaced holes 28 are provided in plate 26 for insertion therethrough of bolts 29 which are screwed into threaded holes 30 in the drum plates 18. Each of the rotator assemblies has an annular plate member or portion 33 which is integral with the periphery of inner plate portion 26. The plate member 33 has a concave side 34 which fits snugly in juxtaposition to one curved convex side 35 of the tire. On the outer convex side 37 of the plate member 33 is a series of circumferentially spaced air scoops or flanges 36. Each air scoop has a spiral curvature in planes perpendicular and parallel to the axis of the circular, flat plate 26. In the plane perpendicular to the axis of the plate 26, the concave and convex curvatures of the scoop are greatest at the radially inner trailing end E of each scoop and the concave and convex curvatures are least at the outer leading end E' of the scoop.

In transverse planes parallel to the axis of plate 26, the outer end E' of both the concave side 38 and convex side 40 are almost tangential to the outer periphery P of plate member 33. Transversely the air scoops are spirally curved. The air scoops in cross section have a tapered form extending spirally inward from the outer lateral edge 41 to the thickened base 44 at the plate member 33; see FIG. 4.

The spiral concavo-convex configuration of each air scoop insures that maximum wind force is applied by the air stream moving in horizontal direction S to the air scoops in the lower half of the vertical wheel 10 when the wheel is moving in the opposite horizontal direction D. The wheel then turns rapidly clockwise in direction C as viewed in FIG. 1. As each air scoop turns the resultant of wind forces exerted on the concave sides 38 of the lower scoops is maximum in direction S. Thus, maximum turning leverage is exerted on the air scoops whose concave sides face in the direction D of wheel travel. The convex sides 40 of the upper air scoops face in direction D so that minimum wind forces are exerted thereon to minimize the counterforces opposing the desired rotational forces on the lower scoops.

The assembly 25$^b$ is a mirror image of assembly 25$^a$ so that the concave sides of the air scoops of both assemblies will face forwardly at the bottom half of each assembly when they are juxtaposed to opposite sides of the tire 16 and both assemblies cooperate in turning the wheel. The concave sides 34 of the plate members 33 face each other with the tire disposed therebetween.

Each of the rotator assemblies 25$^a$ or 25$^b$ is an integral, rigid structure. Each assembly can be made of a light metal such as aluminum, magnesium or the like, or can be made of plastic such as polyester, nylon, melamine or the like. The plastic may be reinforced with fibers of glass, quartz or the like.

In FIGS. 5–8 is shown a tire 16' provided with rotator assemblies 25$^{a'}$, 25$^{b'}$. Each rotator assembly includes an annular plate member 33' having an inner concave side 34' bonded to one of the outer convex sides 35' of the tire. On the outer convex side of the plate member 33' is a series of concavo-convex air scoops 36' shaped and located in the same manner as air scoops 36. The air scoops 36' have radially inner trailing edge E and outer leading edges E'. The scoops are spirally curved in the planes parallel and perpendicular to the axis of plate member 33'. When the tire is vertical as shown in FIGS. 5–8, the concave sides 38 of the lower air scoops 36' and convex sides 40 of the upper air scoops face forwardly. The assemblies 25$^{a'}$, 25$^{b'}$ are mirror images of each other.

Other parts corresponding to those of assemblies 25ª, 25ᵇ are identically numbered.

The rotator assemblies 25ª, 25ᵇ and 25ª′, 25ᵇ′ have the manifest advantages of easy installation. The assemblies 25ª, 25ᵇ are installed and removed by inserting and removing the bolts 28. The assemblies 25ª′, 25ᵇ′ can be installed by vulcanizing, bonding or fusing the assemblies to the tire 16′ at the time of manufacture. Alternatively, the assemblies can be attached at a subsequent time by cementing them to opposite sides of a pneumatic tire.

The assemblies 25ª′, 25ᵇ′ can be made of rubber of stiffer character than the flexible rubber of the tire 16′. Alternatively, it can be made of plastic which may be reinforced. Regardless of the material used for the various assemblies, the hollow, concavo-convex structure of the scoops is very stiff. In use, the air applied to the concave sides of the scoops tends to spread or widen them and in so doing tends to render the scoops even more rigid.

Since the air scoops 36, 36′ are mounted toward the radially outer limits of the tires they exert maximum turning force on the landing wheel as compared with prior rotator structures which employ fins or the like located close to the turning axis of the wheel. A further advantage of the present structure is that the scoops are applied to both sides of each wheel and cooperate in turning the wheel as compared with prior rotators located on only one side of the landing wheel. As a result, the turning power of the rotator assemblies are doubled for each wheel.

It should be noted that a basic characteristic of the invention is the integral structure of the air scoops or flanges with their supporting plates or plate members. In addition to minimizing impact on landing gear when landing, the rotators serve to reduce drag on takeoff. They take full advantage of the spiral curvature of the scoops to produce maximum turning power at each point in their traverse while air impinges on their concave sides.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A rotator assembly for an aircraft landing wheel having a toroidal tire, comprising an annular plate member having inner and outer diameters substantially equal to inner and outer diameters of an outer side of the tire, said plate member having a concave inner side conforming in curvature to the outer side of the tire, and a multiplicity of concavo-convex air scoops integral with said plate member on the outer side thereof, each of said scoops having a concave side facing forwardly at the bottom half of said plate member for receiving the force of an airstream thereon, and having a convex side facing forwardly at the upper half of the plate member for deflecting said airstream, each of said air scoops being spirally curved in both longitudinal and transverse planes taken respectively perpendicular and parallel to the axis of said plate member so that the airstream exerts maximum turning force on the concave side thereof in all positions of the air scoops where the concave side faces the airstream, and a plate integral with said plate member and disposed within the inner diameter thereof, said plate having means for securing the plate to said wheel so that said plate member is juxtaposed against the side of the tire.

2. A rotator assembly for an aircraft landing wheel having a drum for mounting on an axle of the aircraft and a pneumatic tire on the drum, comprising a pair of circular plates secured to said drum, a pair of annular plate members each having an inner periphery integral with the outer periphery of one of the plates, said plate members having concave sides juxtaposed to opposite outer convex sides of the tire, each of the plate members having an inner diameter substantially equal to the inner diameter of an outer side of the tire and having an outer diameter substantially equal to the outer diameter of the outer side of the tire, each plate member having a convex outer side, and a multiplicity of concavo-convex air scoops integral with each plate member on the outer side thereof, each of said air scoops having a concave side facing forwardly at the bottom half of said plate member for receiving the force of an airstream thereon, and having a convex side facing forwardly at the upper half of the plate member for deflecting said airstream, whereby the air scoops on both plate members cooperate in turning the tire and wheel when the wheel is carried forward in the direction of travel of the aircraft, each of said air scoops being spirally curved in both longitudinal and transverse planes taken respectively perpendicular and parallel to the axis of said plate member so that the airstream exerts maximum turning force on the concave side thereof in all positions of the air scoop where the concave side faces the airstream.

References Cited by the Examiner
UNITED STATES PATENTS

| | | | |
|---|---|---|---|
| 2,305,237 | 12/42 | Carpenter | 244—103 |
| 2,408,963 | 10/46 | Westcamp | 244—103 |
| 2,421,156 | 5/47 | Morrow | 244—103 |

FERGUS S. MIDDLETON, *Primary Examiner.*

ANDREW H. FARRELL, *Examiner.*